United States Patent [19]
Oestmann et al.

[11] 3,829,172
[45] Aug. 13, 1974

[54] RECOIL MECHANISM FOR TRACK-TYPE TRACTORS

[75] Inventors: Eldon D. Oestmann, Washington; George F. Alexander, Pekin, both of Ill.

[73] Assignee: Caterpillar Tractor Co., Peoria, Ill.

[22] Filed: Dec. 11, 1972

[21] Appl. No.: 313,969

[52] U.S. Cl. .................................. 305/10, 267/34
[51] Int. Cl. .......................................... B62d 55/00
[58] Field of Search .............. 305/10; 92/75, 50, 69; 267/34, 64 A; 213/43

[56] References Cited
UNITED STATES PATENTS
3,332,725   7/1967   Reinsma ............................. 305/10
3,574,418   4/1971   Okabe ................................. 305/10
FOREIGN PATENTS OR APPLICATIONS
1,923,732   11/1970   Germany ............................ 305/10

Primary Examiner—Robert S. Ward, Jr.
Assistant Examiner—Reinhard J. Eisenzopf
Attorney, Agent, or Firm—Phillips, Moore, Weissenberger, Lempio & Strabala

[57] ABSTRACT

A track-type tractor includes a track frame made up of front and rear portions having front and rear rotatable members associated therewith, and a track trained thereabout. Included are means for tensioning the track and allowing rotatable member recoil, such means including cylinder means fixed relative to the front portion of the track frame and having a first cylindrical portion and a second cylindrical portion of larger cross section than the first cylindrical portion. A first piston is disposed within the first, smaller cylindrical portion and helical spring means are associated with the first piston and a member fixed to the front portion of the track frame to urge them apart. A second piston is disposed within the second, larger cylindrical portion and is fixed relative to the rear portion of the track frame. The cylinder means and first and second pistons define a chamber which is filled with substantially incompressible fluid. Addition of fluid to this chamber moves the front and rear track frame portions relatively apart. The spring means allow recoil of the front track frame portion toward the rear track portion, and because of the incompressibility of the fluid and the different piston sizes, the compressive movement of the spring means is greater than the corresponding amount of recoil movement of the front track frame portion toward the rear track frame portion.

16 Claims, 2 Drawing Figures

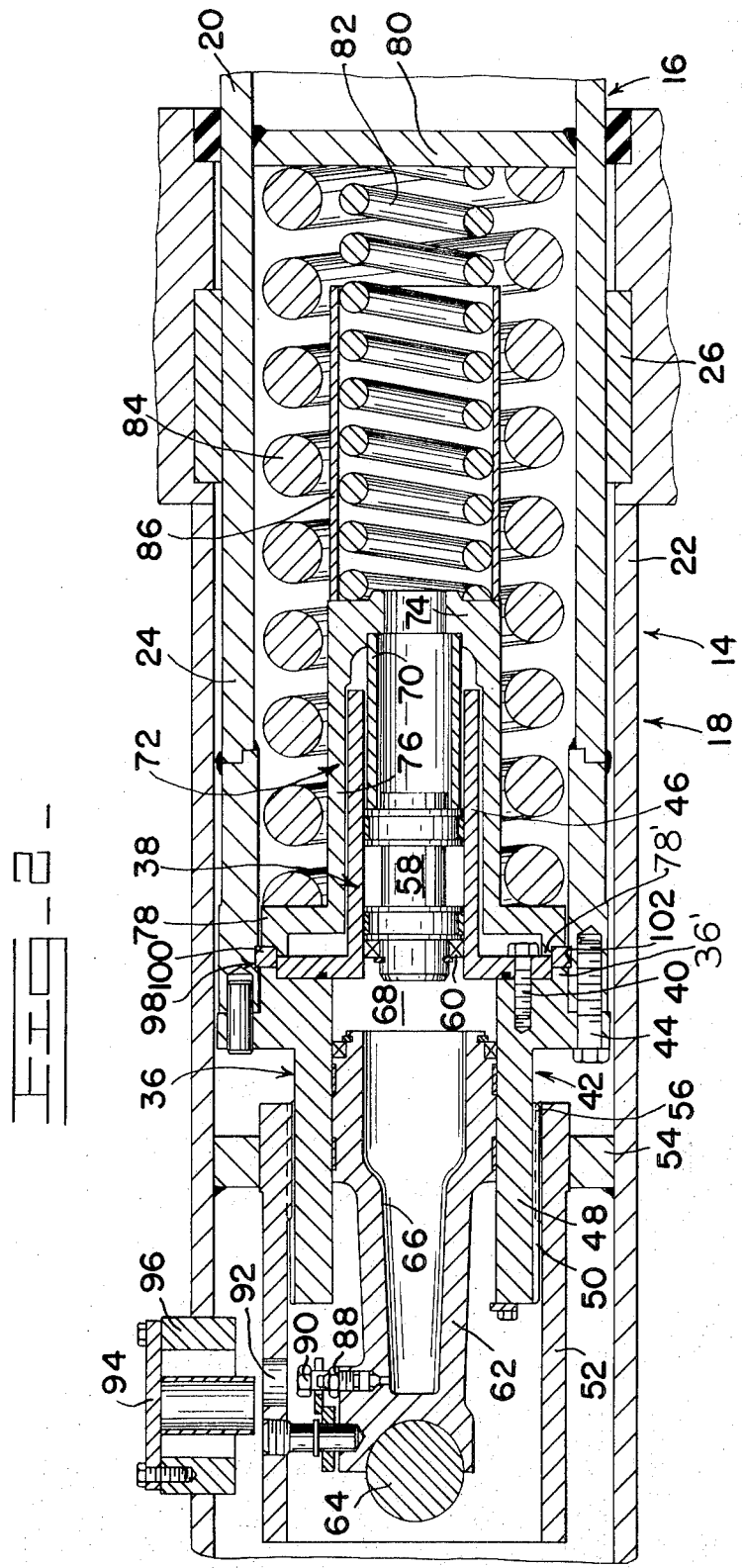

RECOIL MECHANISM FOR TRACK-TYPE TRACTORS

BACKGROUND OF THE INVENTION

This invention relates to track tensioning and recoil systems, and more particularly, to such a system which utilizes cylinder means having first and second cross sectional areas, and first and second pistons disposed in these first and second cross sectional areas respectively.

In track-type vehicles, it is well known to provide movement of a front idler toward and away from a rear drive member so that (i) the track entrained thereabout may be properly tensioned between the front idler and the rear drive member and/or (ii) recoil of the front idler may be allowed. In a conventionally designed vehicle, recoil is allowed by means of a resilient spring which is compressed at the same rate of movement as the actual recoil movement of the front idler toward the rear rotatable member. (See, for example, U.S. Pat. No. 2,887,342 to Helsel.) While such systems are generally effective, it is to be noted that, because spring compression movement is equal to recoil movement, a relatively large, stiff spring must be used (i.e., if spring travel could be designed as greater than the corresponding amount of recoil movement, a smaller, less stiff, and consequently less expensive spring, with greater impact load recoil capacity, could be used).

Examples of systems which achieved different rates of movement are shown in U.S. Pat. No. 3,493,124 to Thompson, U.S. Pat. No. 3,574,418 to Okabe, and U.S. Pat. No. 3,539,229 to Scully. However, the Thompson device achieves less spring (60) compression than the corresponding recoil movement, so that, for good performance, a very stiff, heavy spring would have to be used in this place, which is exactly the opposite of applicants' aim.

The Okabe and Scully devices to indeed provide greater spring movement than the corresponding recoil movement. However, the Okabe device achieves this by the use of an annular piston, which requires sealing on both the inner and outer surfaces thereof, and in addition may be subject to sealing problems, as it is possible for such a piston, of relatively large diameter, to become slightly skewed. (The Thompson patent, in incorporating an annular piston, can suffer from this same problem). And the Scully device includes a wall with the valve therein preventing compression of the spring until the certain, predetermined pressure on the valve is achieved.

In addition to these problems and complications, it must also be kept in mind that safety and convenience of assembly and dis-assembly are always problematical, as the spring or springs incorporated are generally quite large in capacity and can easily cause injury to workmen.

SUMMARY OF THE INVENTION

It is an object of this invention to provide, in a track-type vehicle or the like, track tensioning and recoil means incorporating recoil spring means which provide, upon such recoil, greater spring movement than actual recoil.

It is a further object of this invention to provide, in a track-type vehicle or the like, track tensioning and recoil means which, while fulfilling the above object, allow recoil operation freely and properly under all conditions.

It is a still further object of this invention to provide, in a track-type vehicle or the like, track tensioning and recoil means which, while fulfilling the above objects, allow proper and convenient tensioning of the track.

It is a still further object of this invention to provide, in a track-type vehicle or the like, track tensioning and recoil means which are safe and convenient for handling, assembly, and dis-assembly.

Broadly stated, the invention is in combination with first and second members movable relatively toward and away from each other, and comprises recoil means. Such recoil means comprise cylinder means associated with the first member and movable therewith, comprising a first cylindrical portion and a second cylindrical portion of greater cross-sectional area than the first cylindrical portion and communicating with the first cylindrical portion. A first piston is sized to fit within the first cylindrical portion of the cylinder means. A second piston is associated with the second member and movable therewith relative to the first member and cylinder means, the first and second pistons and the cylinder means defining an enclosed chamber. Reaction means are associated with the first member for movement therewith. Compressible and extensible resilient means are associated with the reaction means and the first piston to urge them apart. Substantially incompressible fluid fills the chamber, so that the amount of movement of the first piston relative to the cylinder means is greater than the corresponding amount of movement of the second piston relative to the cylinder means, whereby, upon relative movement of the first and second members toward each other, the amount of compressing movement of the resilient means is greater than the corresponding amount of relative movement of the first and second members toward each other.

BRIEF DESCRIPTION OF THE DRAWINGS

These and other objects of the invention will become apparent from the study of the following specification and drawings, in which.

DESCRIPTION OF THE PREFERRED EMBODIMENT

Figure 1:
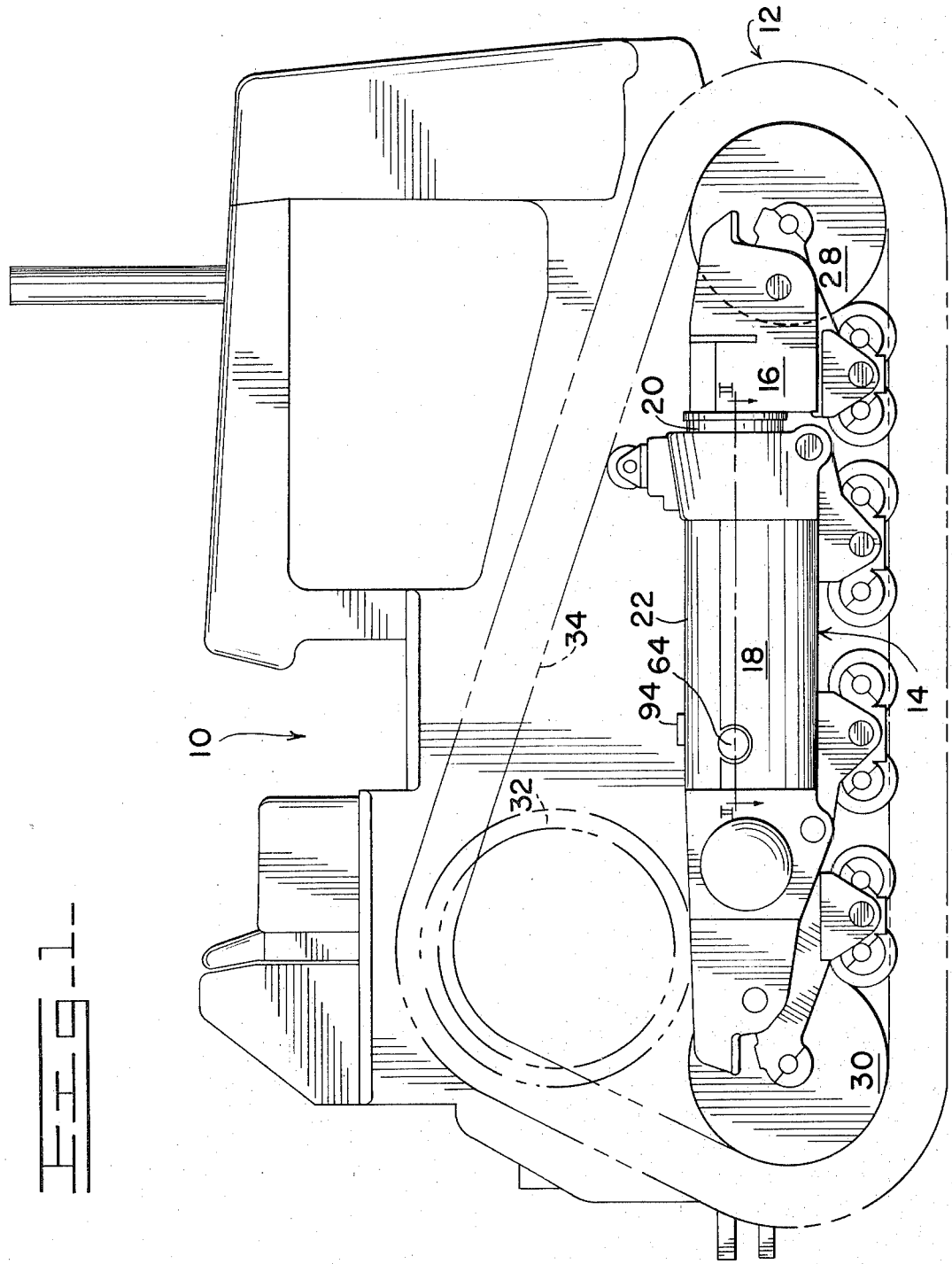
FIG. 1 is a side elevation of a vehicle incorporating the present inventive track tensioning and recoil system; and, FIG. 2 is a sectional side elevation of the track tensioning recoil system incorporated in the vehicle of FIG. 1.

Shown generally in FIG. 1 is a track-type vehicle 10 having track assemblies on either side thereof, one of which is shown at 12. Such track assembly 12 includes a track frame 14 made up of a first, or front track frame portion 16, and a second, or rear track frame portion 18. The track frame portion 16 comprises a tubular body 20, and the track portion 18 also comprises a tubular body 22. The tubular body 20 includes extended portion 24 (FIG. 2), which is disposed within the tubular body 22, and is slidably mounted therein on a bearing 26. Rotatable members 28,30 (FIG. 1), in this embodiment idlers, are mounted to the track frame portions 16,18 respectively as shown. Upon sliding of the tubular body 20 inwardly and outwardly of the tubular body 22, the track frame portions 16,18 are movable relatively toward and away from each other. Thus, the idlers 28,30, upon such sliding movement, are movable therewith relatively toward and away from each other.

A drive sprocket 32 is associated with the vehicle 10 as shown, and conventional drive means (not shown) for this drive sprocket 32 are included. A track 34 is entrained about the idlers 28,30 and is in driven engagement with the drive sprocket 32.

As shown in FIG. 2, a sleeve member 26 is fixed to a smaller diameter sleeve member 38 by means of bolts 40. These sleeve members 36,38 together form cylinder means 42 which are fixed to extended portion 24 of tubular body 20 by means of bolts 44. Such cylinder means 42 comprise a first cylindrical portion 46, formed by sleeve member 38, and a second cylindrical portion 48, formed by sleeve member 36, of greater cross-sectional area than the cylindrical portion 46, and communicating with the cylindrical portion 46. Such cylinder means 42, it will be seen, are movable with the track frame portion 16, fixed to the extended portion 24 of the tubular body 20.

The cylindrical portion 48 has formed on the outer surface thereof longitudinal splines 50. Inward of the tubular body 22 and toward the rear thereof is a tube 52 fixed to the tubular body 22 by means of a ring 54. Such tube 52 has formed on the inner surface thereof longitudinal splines 56 in engagement with the splines 50. Through such splines 50,56, the tubular bodies 20,22, and thus the front and rear idlers 28,30 are kept in alignment.

A piston 58 is sized to fit within the cylindrical portion 46, and includes seal means 60 thereabout and in engagement with the inner surface of the cylindrical portion 46. Such piston 58 defines a continuous cross-sectional surface which substantially completely fills in the cross-sectional area of the cylindrical portion 46. A piston 62 is fixed to tube 52 by means of a shaft 64 and is thus associated with the track frame portion 18 to move therewith relative to the track frame portion 16. The piston 62 defines an internal cavity 66 which, along with piston 58, and the cylinder means 42, defines a closed chamber 68, wherein every portion thereof is in continuous open communication with every other portion thereof.

A spacer 70 is disposed within cylindrical portion 46 and contacts piston 58. A sleeve 72 is in contact with spacer 70 and has a flange member 74 extending radially inwardly of a tubular portion 76, and a flange member 78 extending outwardly of the tubular portion 76 and outwardly of the flange member 74, as shown. A plate 80 is fixed within tubular body 20. A compressible and extensible helical spring 82 is disposed between the flange member 74 and plate 80, and is in contact with such flange member 74 and plate 80. A compressible and extensible helical spring 84 is disposed between flange member 78 and the plate 80, and is in contact with such flange member 78 and plate 80. It will be seen that extended portion 24 of tubular body 20 actually makes up a casing which houses the helical springs 82, 84 and the sleeve 72, including flange members 74, 78. A guide 86 fixed to tubular portion 76 both contains spring 82 and serves as a positive stop for plate 80. As will be seen, the plate 80 acts as force reaction means.

A supply fitting 88 and a relief fitting 90 are mounted to piston 62 and communicate with chamber 68. Access to fittings 88, 90 is provided by an aperture 92 in tube 52, which may be reached by removing a cover plate 94 on a service port 96 fixed to tubular body 22. Substantially incompressible fluid, such as grease, is supplied through fitting 88 to expand and fill out chamber 68. Such pressurized fluid moves the pistons 58 and 62 apart, moving the piston 62 outward of the cylinder means 42. Such movement, of course, moves the tubular bodies 20, 22 (and track frame portions 16, 18) apart, to in turn move idlers 28, 30 apart to tension the track 34. With the chamber 68 filled with incompressible fluid, it will be seen that upon movement of piston 62 relative to cylinder means 42, the amount of movement of piston 58 relative to cylinder means 42 is greater than the corresponding movement of piston 62 relative to the cylinder means 42. This is because of the different cross-sectional areas of cylindrical portions 46 and 48, i.e., any incompressible fluid which is to be forced from cylindrical portion 48 must move into cylindrical portion 46. Since the fluid is substantially incompressible, a certain volume leaving cylindrical portion 48 must enter cylindrical portion 46. With cylindrical portion 46 being of smaller cross-section than cylindrical portion 48, this displaced volume must be taken up by greater movement of piston 58.

It will be seen that, upon movement of the track frame portions 16,18 relatively toward each other, (i.e., the recoil condition) piston 62 is moved relatively rightward (FIG. 2) a certain distance, and piston 58 is forced rightward by the incompressible fluid a greater amount relatively rightward than such movement of the piston 62. Consequently, the compressing movement of the helical springs 82,84 is greater than the corresponding amount of relative movement of the track frame portions 16,18 toward each other. This feature allows the use of recoil springs 82,84 which are less stiff than usual, since more of their recoil travel is utilized for a given track frame recoil movement. Consequently, relatively great impact load recoil capacity is provided.

It is to be noted that the outer edge of the flange member 78 is in intimate relation with the inner surface of the casing 24. Locking means 98 are associated with the inner surface of the casing 24 and are positioned to contact such flange member 78. The locking means 98 comprise a plurality of lock ring segments 100 seatable in an annular groove 102 defined by the inner surface of the casing 24. Such segments 100 limit the movement of the flange members 74,78 under the urging of the springs 82,84.

Such feature is an important safety and assembly advantage. The helical springs 82,84 may be pre-assembled by inserting them into casing 24 and placing sleeve member 72 and attached guide 86 over the exposed ends thereof. The sleeve member 72 is then loaded to compress springs 82, 84 to the normal pre-loaded operating position shown in FIG. 2. The segments 100 are then inserted in groove 102, to thereby retain the sleeve member 72 and springs 82, 84. Maximum effectiveness and safety are afforded by the spring assembly by having an annular shoulder 78' on flange 78 positively retain ring segments 100 and by providing an abutting contact with extending ring portion 36' on sleeve member 36. Through such an abutting contact, supplemental retaining support is provided in withstanding the high loads and impact forces of the spring driving recoiling functions. This assembly may then be installed, removed, or serviced as a unit independently of the track frame 14.

What is claimed is:

1. In combination with first and second members movable relatively toward and away from each other, recoil means comprising:

cylinder means associated with the first member and movable therewith, and comprising a first cylindrical portion and a second cylindrical portion of greater crosssectional area than the first cylindrical portion and communicating with the first cylindrical portion;

a first piston sized to fit within the first cylindrical portion of the cylinder means;

a second piston associated with the second member and movable therewith relative to the first member and cylinder means, the first and second pistons and the cylinder means defining a closed chamber;

reaction means associated with the first member for movement therewith;

compressible and extensible resilient means associated with the reaction means and first piston to urge them apart; and, substantially incompressible fluid filling the chamber, so that the amount of movement of the first piston relative to the cylinder means is greater than the corresponding amount of movement of the second piston relative to the cylinder means, whereby, upon relative movement of the first and second members toward each other, the amount of compressing movement of the resilient means is greater than the corresponding amount of relative movement of the first and second members toward each other.

2. The recoil means of claim 1 wherein the first piston defines a continuous cross-sectional surface which substantially completely fills in the cross-sectional area of the first cylindrical portion.

3. The recoil means of claim 2 wherein every portion of the chamber is in continuous open communication with every other portion of the chamber.

4. The recoil means of claim 3 wherein the resilient means comprise helical springs.

5. In a vehicle having a track frame comprising first and second track frame portions movable relatively toward and away from each other, first and second rotatable members mounted to the first and second track frame portions and movable relatively toward and away from each other upon such relative movement of the first and second track frame portions, and a track entrained about the first and second rotatable members, recoil apparatus comprising:

cylinder means associated with the first track frame portion and movable therewith, and comprising a first cylindrical portion and a second cylindrical portion of greater cross-sectional area than the first cylindrical portion and communicating with the first cylindrical portion;

a first piston sized to fit within the first cylindrical portion of the cylinder means;

a second piston associated with the second track frame portion and movable therewith relative to the first track frame portion and cylinder means, the first and second pistons and the cylinder means defining a closed chamber;

reaction means associated with the first track frame portion for movement therewith;

compressible and extensible resilient means associated with the reaction means and the first piston to urge them apart; and, substantially incompressible fluid filling the chamber, so that the amount of movement of the first piston relative to the cylinder means is greater than the corresponding amount of movement of the second piston relative to the cylinder means, whereby, upon relative movement of the first and second track frame portions toward each other the amount of compressing movement of the resilient means is greater than the amount of corresponding relative movement of the first and second track frame portions toward each other.

6. The vehicle of claim 5 and further comprising means for selectively introducing pressurized substantially incompressible fluid into the chamber to move the second piston relatively outwardly of the cylinder means, to in turn move the first and second track frame portions relatively apart, in turn moving the rotatable members apart to tension the track.

7. The vehicle of claim 6 wherein the first piston defines a continuous cross-sectional surface which substantially completely fills in the cross-sectional area of the first cylindrical portion.

8. The vehicle of claim 7 wherein every portion of the chamber is in continuous open communication with every other portion of the chamber.

9. The vehicle of claim 8 wherein the resilient means comprise helical springs.

10. The vehicle of claim 9 and further comprising a sleeve, having tubular portion surrounding said first cylindrical portion, a first flange member extending radially inwardly of the tubular portion, and a second flange member connected to the first flange member and extending radially outwardly of the first flange member, and wherein the helical springs comprise a first helical spring disposed between the first flange member and the reaction means, and in contact with the first flange member, and a second helical spring disposed between the second flange member and the reaction means, and in contact with the second flange member.

11. The vehicle of claim 10 wherein the first track frame portion comprises a casing which houses the first and second helical springs and first and second flange members, with the outer edge of the second flange member in intimate relation with the inner surface of the casing, the cylinder means being fixed to said casing.

12. The vehicle of claim 11 and further comprising locking means associated with the inner surface of the casing positioned to contact the second flange member upon urging thereof by the first and second helical springs, to limit movement of the first and second flange members under such urging of the first and second helical springs.

13. The vehicle of claim 12 wherein the locking means comprise a plurality of locking members seatable in an annular groove defined by the inner surface of the casing.

14. The vehicle of claim 13 wherein the first track frame portion comprises a first tubular body, and wherein the casing comprises an extended portion of said first tubular body, and wherein the second track frame portion comprises a second tubular body, with the first tubular body disposed within the second tubular body and slidable inwardly and outwardly thereof.

15. The vehicle of claim 14 wherein the reaction means comprise a plate fixed within the first tubular body and contacting the first and second helical springs.

16. The vehicle of claim 15 wherein the first and second rotatable members comprise idlers.

* * * * *